United States Patent [19]

Chea, Jr.

[11] 4,349,703
[45] Sep. 14, 1982

[54] PROGRAMMABLE RING SIGNAL GENERATOR

[75] Inventor: Ramon C. W. Chea, Jr., Monroe, Conn.

[73] Assignee: International Telephone and Telegraph Corporation, New York, N.Y.

[21] Appl. No.: 135,755

[22] Filed: Mar. 31, 1980

[51] Int. Cl.³ .................... H04M 3/02; H04M 19/02
[52] U.S. Cl. ......................... 179/18 HB; 179/51 AA
[58] Field of Search ............ 179/18 HB, 18 J, 17 E, 179/51 AA, 84 R, 84 A; 370/110

[56] References Cited

U.S. PATENT DOCUMENTS 3,443,033  5/1969  Louis ....................... 179/18 HB X
3,978,292  8/1976  Hill et al. .................... 179/18 HB
4,075,430  2/1978  Reines ......................... 179/18 J
4,270,028  5/1981  Young ......................... 179/84 R Primary Examiner—Thomas W. Brown
Attorney, Agent, or Firm—John T. O'Halloran; Jeffrey P. Morris

[57] ABSTRACT

The present invention comprehends an improved ringing circuit particularly suitable for digital telecommunications systems wherein the energizing and de-energizing of the ring circuitry is programmably controlled to provide for either hardware or software generation of ringing cadence, dc bias polarity, dry-switching of ring relays, and other signaling voltages. Further in accordance with the invention, a digital implementation of a complete ringing circuit is achieved without the use of bulky transformers.

12 Claims, 28 Drawing Figures

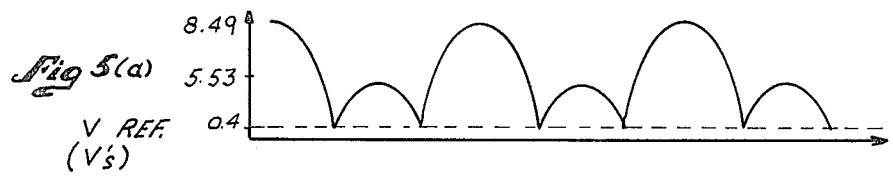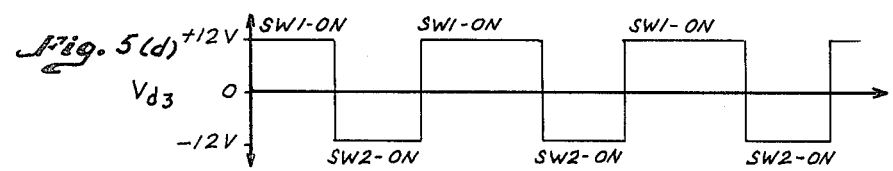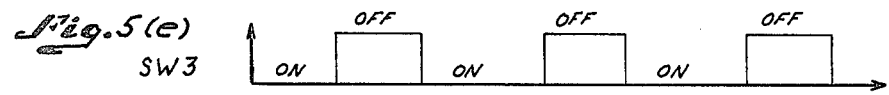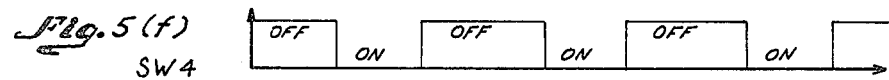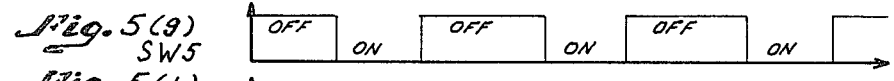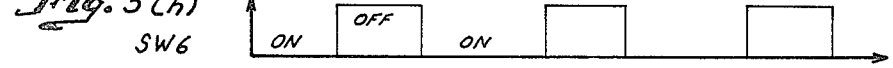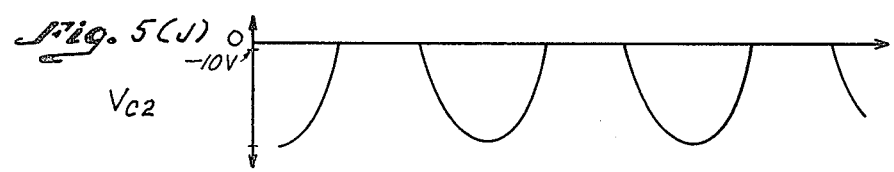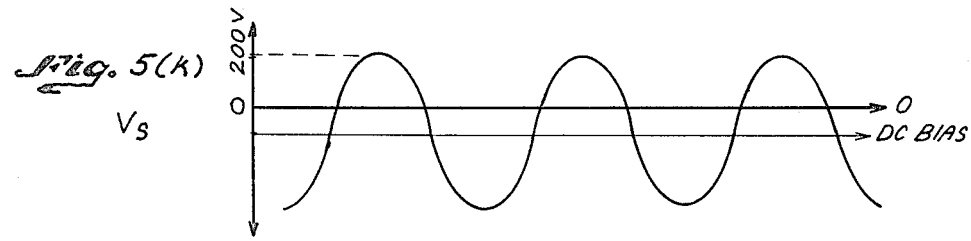

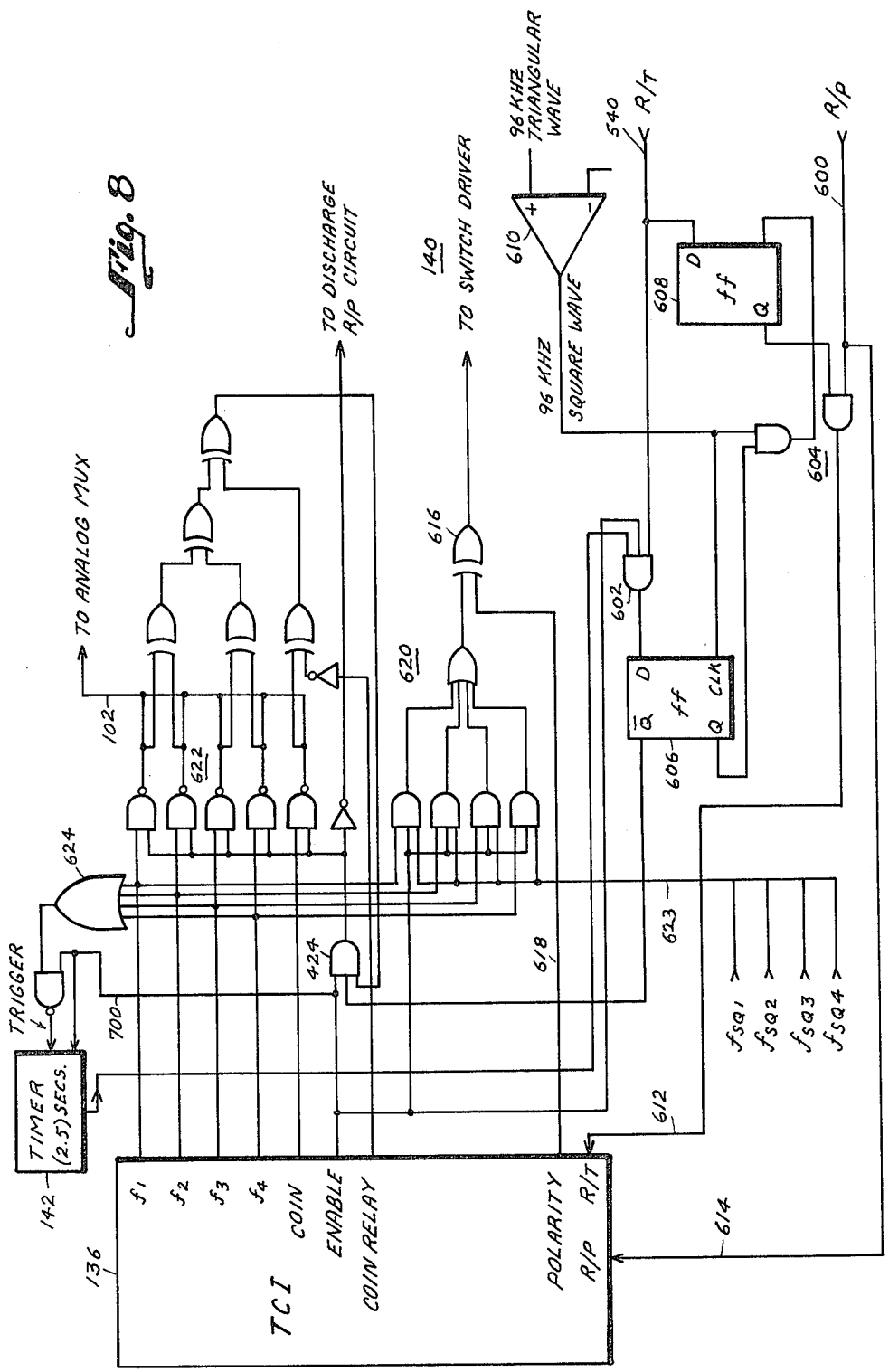

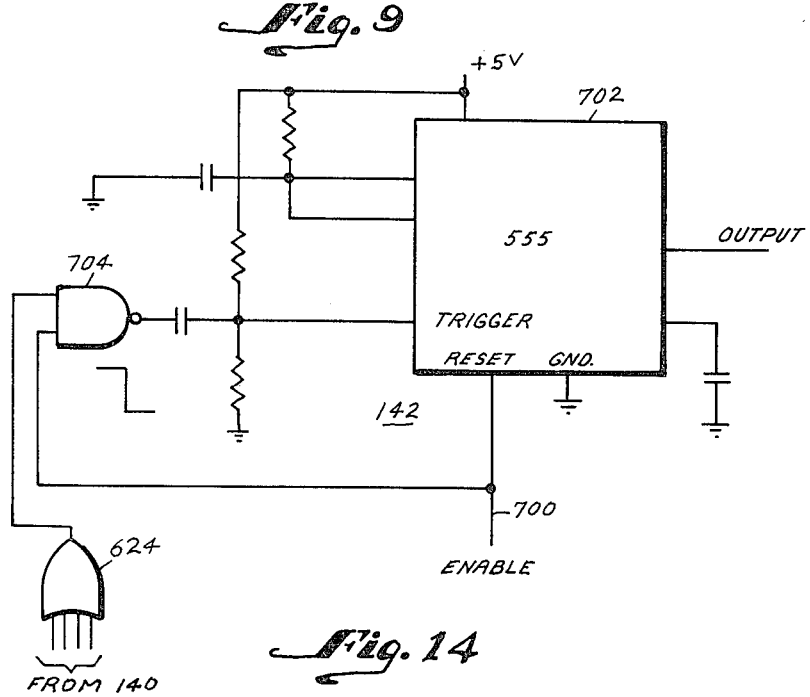
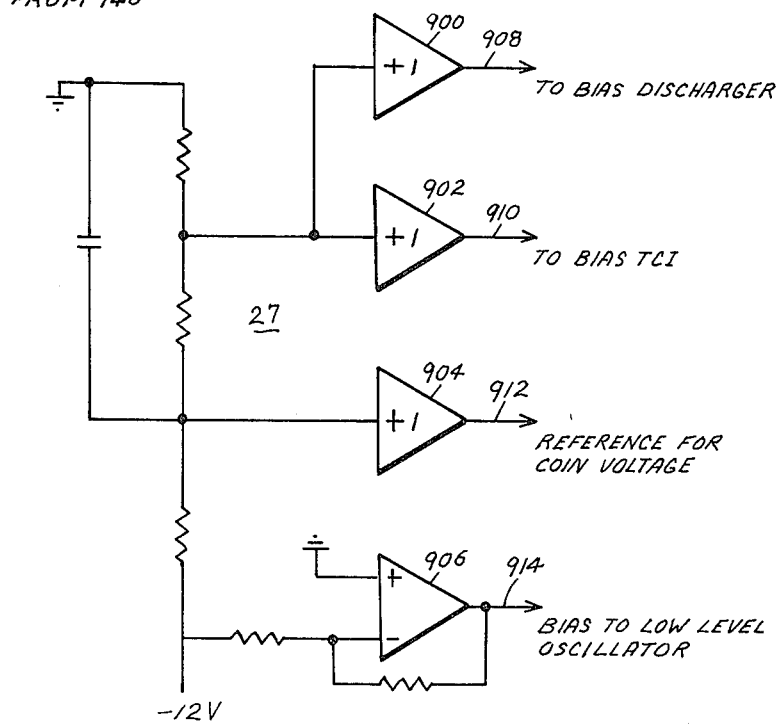

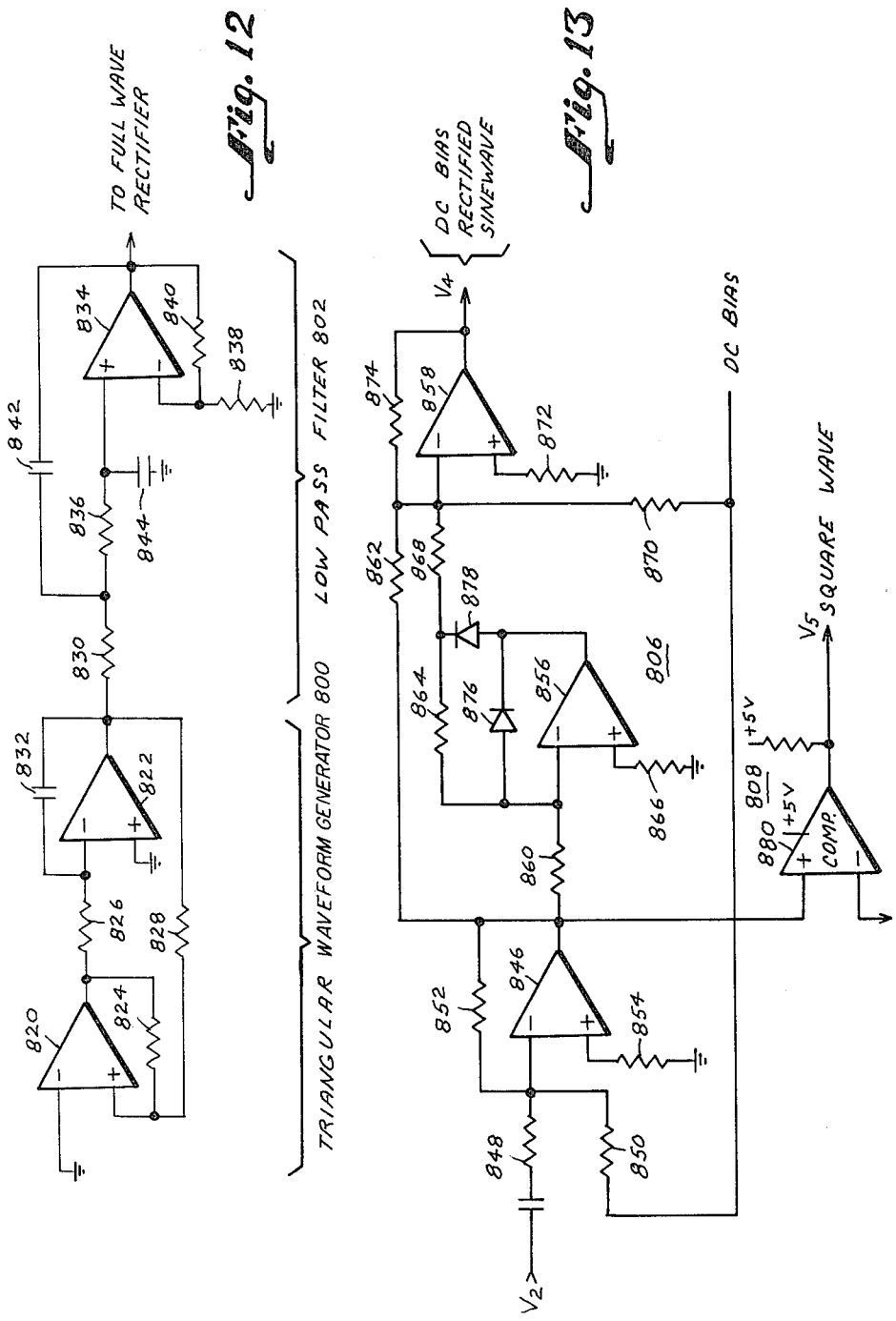

PROGRAMMABLE RING SIGNAL GENERATOR

CROSS REFERENCE TO RELATED APPLICATION

Reference is made to application Santanu Das, et al Ser. No. 135,756, Analog Subscriber/Trunk Module with Shared Ringing Source and Ring-Trip, filed on even date herewith and assigned to the same assignee as is the instant application.

BACKGROUND OF THE INVENTION

1. Field of the Invention

The present invention relates generally to digital telecommunication systems having controllable ringing signal or other signal generation capability for interconnection to a plurality of analog lines, and specifically to telephone systems having improved ringing circuitry.

2. Description of the Prior Art

In telephone switching systems of the prior art, ringing has been provided from service circuits; i.e., ringing trunk lines such that at any given instant in time only one analog subscriber line may be rung from one such ringing circuit. Thus, a ring-trip circuit must be provided for each such prior art ringing circuit. When a requirement exists for immediate ringing, then the service circuit has had two sources of ringing connected thereto. One source being continuous and the other being phased. Such service circuit has included control which connects the analog subscriber line to be rung to the continuous ringing source for a predetermined time duration, such as 300 milliseconds, and then to the phased ringing source. Such prior art technique and similar known prior art ringing techniques require for multi-frequency ringing either different service circuits or the service circuits having the capability of providing any type of ringing. Such requirement involves the busing of different frequency sources and the inclusion of a plurality of relays or switches for each service circuit. The aforementioned ringing schemes of the prior art are unsuitable for use in digital switching systems, since ringing signals cannot be transmitted through the digital network.

Examples of such prior art telephone ringing systems may be had with reference to U.S. Pat. No. 3,767,857 relating to distributed immediate ringing circuits for a telephone system. U.S. Pat. No. 3,678,208 relating to immediate ringing by use of junctors assigned to different time slots of the ringing cycle. U.S. Pat. No. 4,075,430 (assigned to the assignee of the present invention) relating to line signaling over common highway for telecommunications systems. U.S. Pat. No. 3,005,053 relating to telephone signaling systems applying different signaling frequencies in different time slots. U.S. Pat. No. 3,085,133 relating to automatically controlled ringing with the provision of a ring immediately after connection, then ringing in accordance with the regular ringing cycle; and U.S. Pat. No. 3,118,019 relating to the connection of a ringing source to the desired telephone subscriber through a pair of gates in series, which must both switch in phase to permit the ringing signal to reach the subscriber. Digital telephone line circuits of the type contemplated to be employed with the present invention and which contain programmable signal generators having the capability of digitally generating ac and dc signaling voltages are available as exemplified, for example, by U.S. Pat. No. 4,161,633 of Robert Treiber and assigned to the assignee of present invention; and reference may be made to U.S. Pat. No. 4,161,633 for details of the implementation of programmable signal generation in a digital telephone line circuit. Digital telecommunications switching systems of the type with which the present invention is particularly advantageously employed are described in detail by U.S. Pat. No. 4,201,889 of A. J. Lawrence, et al, assigned to the assignee of the present invention, and reference may be made to said Lawrence et al Patent for details of such digital switching system.

SUMMARY OF THE INVENTION

The present invention comprehends an improved ringing circuit particularly suitable for digital telecommunications systems wherein the energizing and de-energizing of the ring circuitry is programmably controlled to provide for either hardware or software generation of ringing cadence, dc bias polarity, dry-switching of ring relays, and other signaling voltages. Further in accordance with the invention, a digital implementation of a complete ringing circuit is achieved without the use of bulky transformers.

BRIEF DESCRIPTION OF THE DRAWINGS

FIGS. 5(a) thru 5(k) are waveforms useful in describing the operation of the invention;

FIG. 8 is a schematic of the ring circuit control logic of the invention;

FIG. 9 is a schematic of a timer used in the invention;

FIG. 12 is a schematic of a ring oscillator used in the present invention;

FIG. 13 is a full wave rectifier circuit used in the present invention;

FIG. 14 is a schematic of a dc voltage generator circuit used in the present invention.

DESCRIPTION OF THE PREFERRED EMBODIMENT

Figure 1:
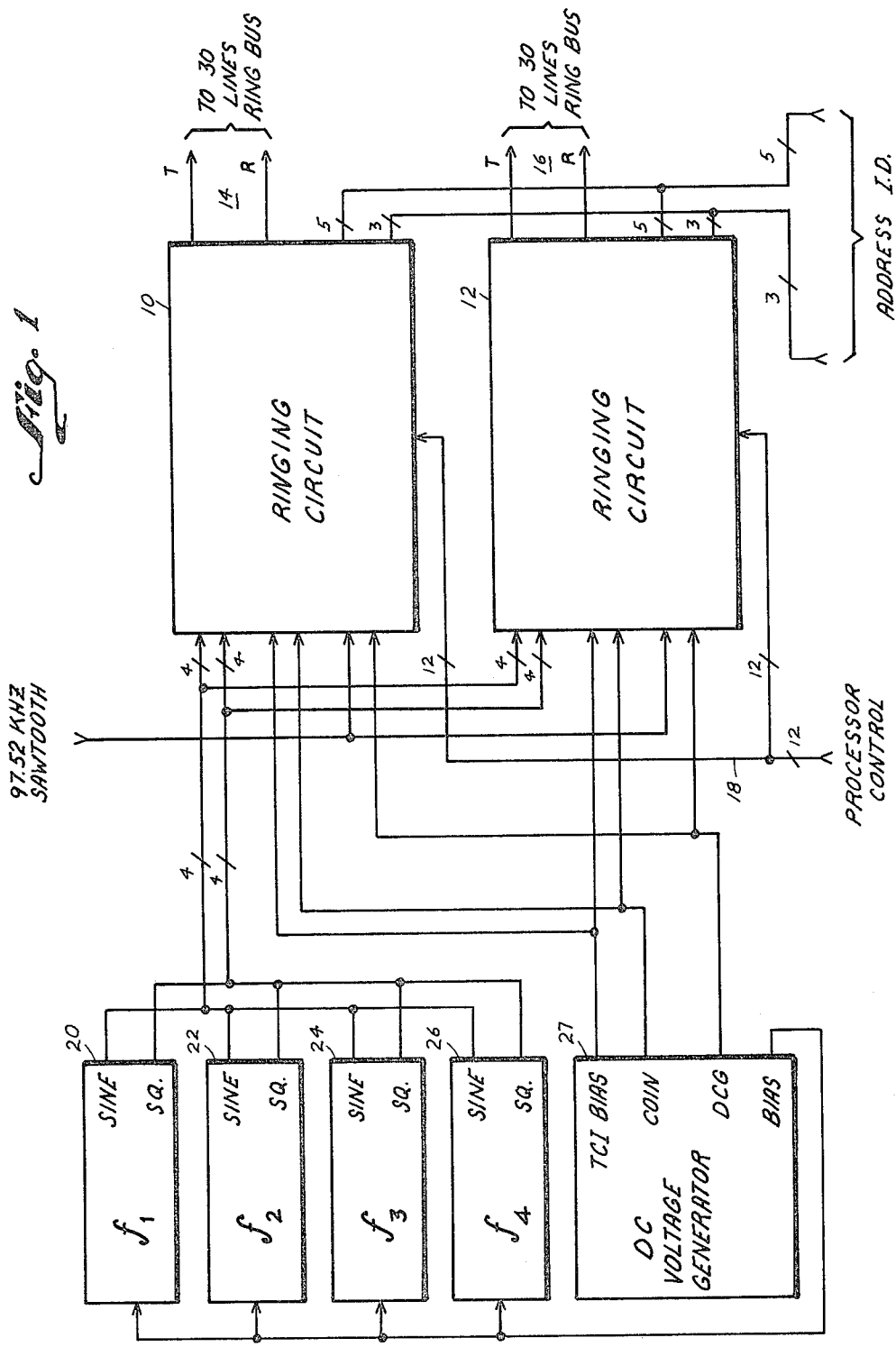
FIG. 1 is a shared ringing circuit configuration in which the ring signal generator of the invention can be advantageously used.

Referring to FIG. 1, the organization of a pair of ringing circuits 10 and 12, each in accordance with the present invention, is illustrated in a shared ringing architecture such that the same ringing circuits 10 and 12 may be shared over a plurality of subscriber lines/trunks. Such shared configuration is the subject of co-pending patent application of S. Das, et al Ser. No. 135,756 referenced hereinbefore. The instant application relates to the details of ringing circuit 10, which is identical to ringing circuit 12, and FIG. 1 is provided, together with FIGS. 10 and 13 for a more complete description of the technical environment of the invention. Ring circuits 10 and 12 function as buffer amplifiers which translate low level signals, received from a plurality of ac signal sources and a dc signal source, into high voltage/power signals, which are required for telephone ringing. In a preferred subsystem architecture, each ringing circuit 10 and 12 is capable of providing ringing signals to a group of 30 subscriber lines/trunks via a common ring bus to which ringing circuits 10 and 12 are coupled via lines 14 and 16, respectively. Each of ringing circuits 10 and 12 provides, for example, one of four frequencies of a fixed amplitude superimposed upon either a positive or negative dc bias that is selectable by an external control signal which may originate at a programmably controlled processor or microprocessor, and which is shown as inputted to ringing circuits 10 and 12 via processor interface bus 18. It is sufficient for an understanding of the present invention that the control signal on bus 18 is a logic signal, and the specifics of any programming per se of the processor do not constitute a portion of the invention. It is also to be understood that the ringing circuit of the present invention can provide signals useful for purposes other than telephone ringing per se, such as positive or negative dc voltage for coin phone control.

Each ring signal reference source 20, 22, 24 and 26 provides a distinct ac signal of a particular frequency at a pair of outputs, one of which outputs is a dc biased rectified sinusoidal waveform and the other of which outputs is a squarewave. The output signals from the ring signal reference sources are synchronized at their zero crossing points. The rectified sinusoidal outputs are used as the reference input to the ringing circuits 10 and 12 and the squarewave outputs are used in conjunction with output stage commutating switches within the ring circuit. Dc voltage generator 27 provides dc biasing voltages, and is described in greater detail hereinafter, as is the ring signal reference source.

Figure 2:
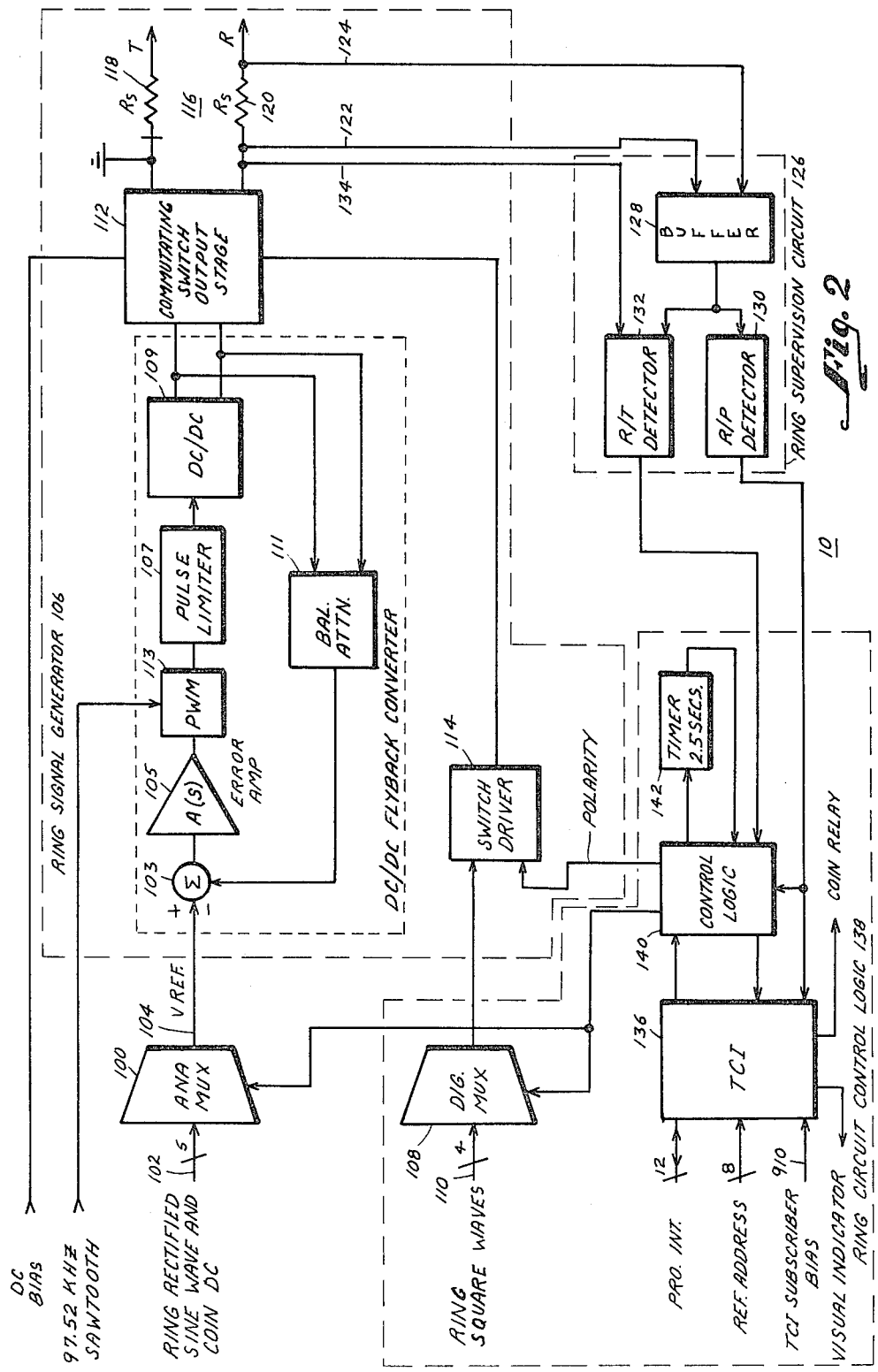
FIG. 2 is a functional block diagram of a ringing circuit of the invention.

Referring to FIG. 2, a functional block diagram of the ringing circuit 10 of the present invention is illustrated. Analog multiplexer 100, under processor control, selects a ring reference source output sinusoidal signal on one of four input lines (another line is included for a dc signal input) shown for illustrative purposes as line 102 and provides a voltage reference signal on line 104 to the ring signal generator 106, which functions as a dc/dc flyback converter. Together with output stage 112, ring signal generator is comprised of summer 103, error amplifier 105, pulse width modulator 113, pulse limiter 107, dc to dc converter 109 and balanced attenuator 111. Ring signal generator 106 is described in detail with reference to FIG. 3. Digital multiplexer 108 selects a corresponding squarewave output from the ring signal reference sources on any of four input lines under processor control, shown illustratively as line 110. The selected squarewave operates the output stage 112 of the ring signal generator 106 after amplification by switch driver 114. Output stage 112 is a commutating switch, and the signal coupled thereto is an amplified reference signal having sufficient power to drive the desired load, i.e., for ringing; while the output of commutating switch 112 is coupled to the telephone subscriber tip and ring lines via the ring bus. A typical subscriber line connection is illustrated at 116. The commutating switch 112 output is a sinusoidal signal which is reconstructed from a rectified signal by the synchronized commutation of switches, as will be described later herein. Resistors 118 and 120 function as current sensors and for current limiting and surge protection. Switch driver 114 provides level shifting from low level logic signal input to higher level signal to drive the high voltage switches 112.

The supervisory control signal on lines 122 and 124 which are coupled to ring supervisory circuit 126 are derived by sensing the current flow in the subscriber loop thru sensing resistor 120, which current is then detected by buffer 128. The sensed signal coupled to buffer 128 may include ac only or ac and dc components. Subscriber OFF-Hook signal (ring-trip) is obtained by filtering out the ac component and comparing the remaining dc signal with a reference dc signal derived directly from the signal source. This is accomplished in ring supervision circuit 126, which is equivalent to a bridge circuit with high precision and insensitivity to source voltage variation. Ringing current presence detector 130 detects ring current in the subscriber loop from the output of buffer 128 by feeding the output signal to a peak detector circuit; the output of which peak detector is compared to a reference signal which defines the threshold for a positive current present condition. Ring-trip detector circuit 132 detects ring trip via line 134 and the output of buffer 128. Ring presence and ring-trip signals are coupled to the processor via termination control interface circuit 136, which provides the communication interface between the processor and the ring circuit and which is a portion of the ring circuit control logic 138. Control logic 140 checks the data integrity of the data instructions received by the termination control interface 136 from the processor, and energizes ring signal generator 106 upon receipt of a positive polarity signal. A security timer 142 limits the energization to 2.5 seconds to protect the ringing circuit from damage which could result from a prolonged ringing interval caused, for example, by faulty data.

Figure 3:
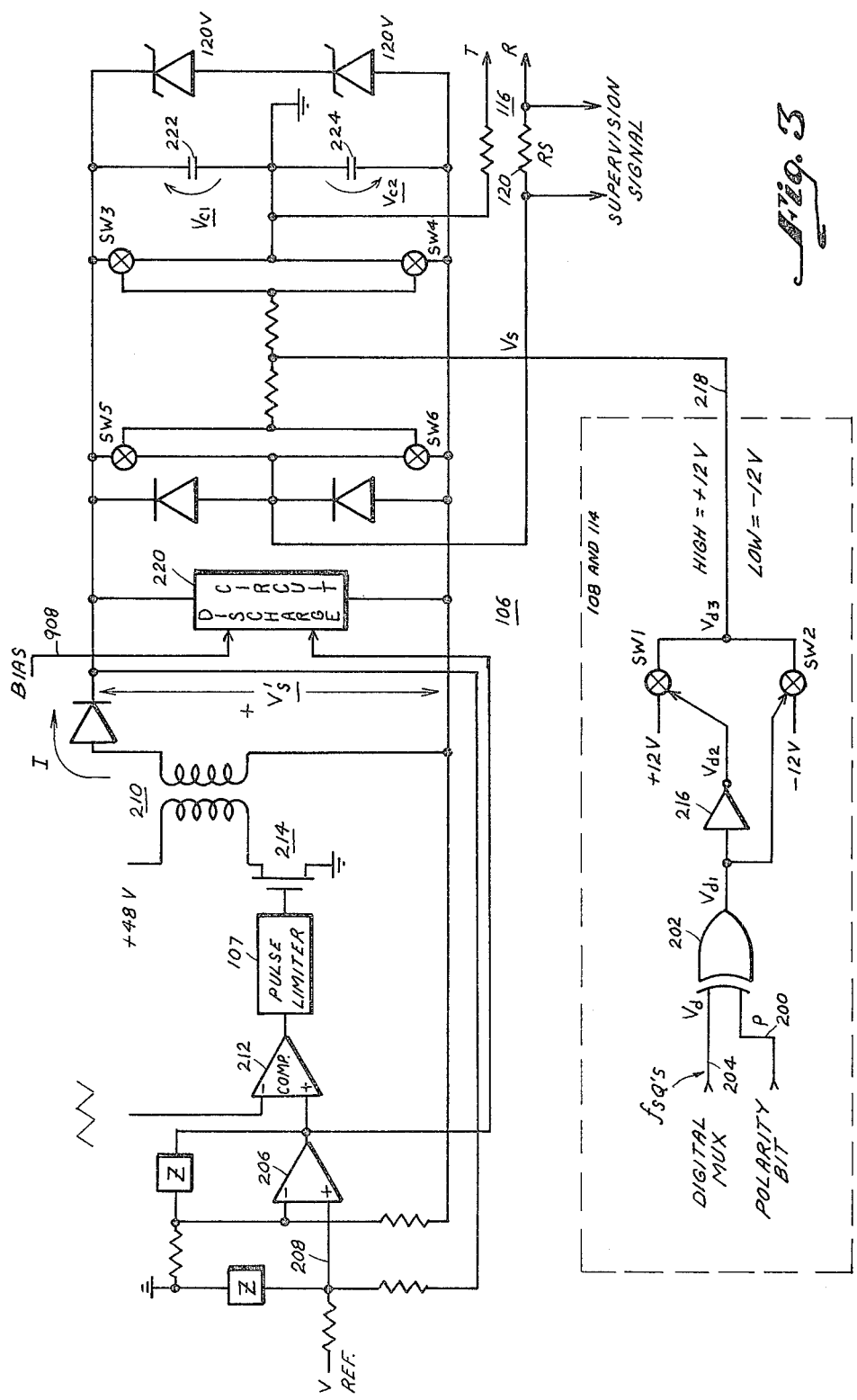
FIG. 3 is a schematic of a ring signal generation circuit of the invention.

Referring now to FIG. 3, a detailed schematic of ringing signal generator 106 is illustrated. To generate a ringing signal by energizing ringing circuit 106, the processor sends a command via digital multiplexer 108 on line 200 thru the control logic 140 from the termination control interface 136 in the form of a polarity bit, which specifies dc polarity and selects a frequency. A positive polarity on line 200 energizes the ringing circuit 106. A negative polarity inhibits the ringing circuit from energizing. The input to NOR gate 202 in digital multiplexer 108 consists of ring signal reference source output squarewaves on line 204 and the polarity bit input on line 200. The squarewaves Vd on line 204 are illustrated by waveform FIG. 5(b). Analog multiplexer 100 output Vref, illustrated by FIG. 5(a), is coupled to error amplifier 206 on line 208 with a feedback signal on the other input derived from the output $vs^1$ of a small dc/dc converting ferrite pulse transformer 210. A 97.52 KHz sawtooth waveform is coupled to one input of comparator 212 and the output of amplifier 206 is coupled to the positive input of comparator 212, which functions as a pulse width modulator; the output of which is coupled to pulse limiter 107 and then to the gate of FET 214 for amplification prior to dc/dc conversion by ferrite pulse transformer 210 to $v^1s$.

The output of NOR gate 202 is $V_{d1}$ shown by FIG. 5(b) when a logic zero appears on line 200 and switch 2 is ON. $V_{d1}$ appears also when logic one is present with switch 2 OFF. Signal $V_{d2}$ shown by FIG. 5(c) is present at the output of inverter 216 for logic 0, switch 1 ON and for logic 1, switch 1 OFF. The output of switches 1 and 2 is $V_{d3}$, illustrated by FIG. 5(d), which is a squarewave having a positive level of +12 volts and a negative level of −12 volts.

The tables below describe the various positions of commutation switches SW1, SW2, SW3, SW4, SW5 and SW6 in the commutation switch output stage 112 in relation to $V_d$, $V_{d2}$ and $V_{d3}$.

| Signal | Logic State of Polarity Bit | Switch | Switch State |
|---|---|---|---|
| $V_{d2}$ | 0 | SW1 | ON |
| $V_{d2}$ | 1 | SW1 | OFF |
| $V_{d1}$ | 0 | SW2 | ON |
| $V_{d1}$ | 1 | SW2 | OFF |

| $V_{d3}$ | SW3 | SW4 | SW5 | SW6 |
|---|---|---|---|---|
| +12V | ON | OFF | OFF | ON |
| −12V | OFF | ON | ON | OFF |

Figure 4:
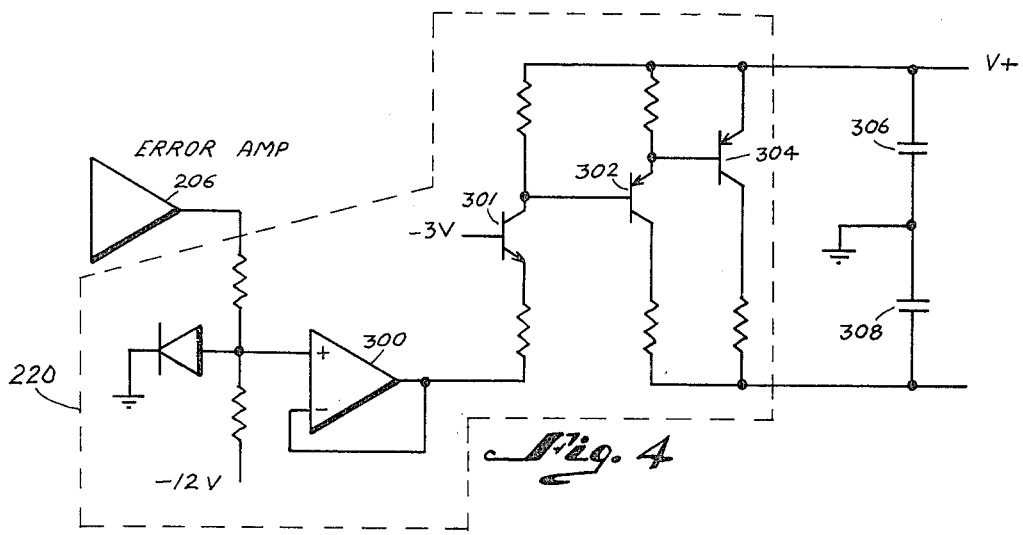
FIG. 4 is a schematic of a discharge circuit used in the invention.

$V_{d3}$ is coupled to the commutation switches on line 218 to switch the output of discharge circuit 220, illustrated by FIG. 4. The generated ringing signal is coupled to tip and ring lines via 116 and a supervision signal is sensed across resistor 120.

FIGS. 5(e) thru 5(h) are waveforms illustrative of the relationship of the switching, respectively of switches SW3, SW4, SW5 and SW6 in response to $V_{d3}$. FIG. 5(i) illustrates the waveform of $v_{c1}$ across capacitor 222 and FIG. 5(j) illustrates the waveform of $v_{c2}$ across capacitor 224. FIG. 5(k) is illustrative of the output ringing signal on 116, and is the sum of the waveforms $v_{c1}$ and $v_{c2}$ and has a peak of about 200 volts.

Current flowing in the subscriber loop is detected by ring present detection circuit 130. Detection of OFF-Hook causes an OFF-Hook status signal to be coupled to the processor and the initiation of ringing signal removal process. Ring removal is accomplished by changing Vref to zero. When current in sense resistor 120 has subsided, as indicated by the logic state of the output of 130 (described in greater detail with reference to FIGS. 6 and 7), a processor command to release the ring relay in the line circuit is obtained, achieving dry-switching. A similar shut-down procedure is implemented at the conclusion of each ringing interval. The ringing cadence, i.e. the provision of a burst of ringing signal at a predetermined time interval, may be governed by processor software or other command origination, by turning ring circuit 106 ON and OFF at specific intervals.

Referring now to FIG. 4, discharger circuit 220 is illustrated. The output of error amplifier 206 is coupled to one input of operational amplifier 300, which functions to distribute the total discharge power between transistors 302 and 304. Transistor 301 has a −3 volt base bias and its collector tied to the base of amplifier 302. The amplified output voltage V is discharged thru capacitors 306 and 308 to provide a smooth discharge transition. The amount of discharging current is proportional to the error signal from amplifier 206.

Figure 6:
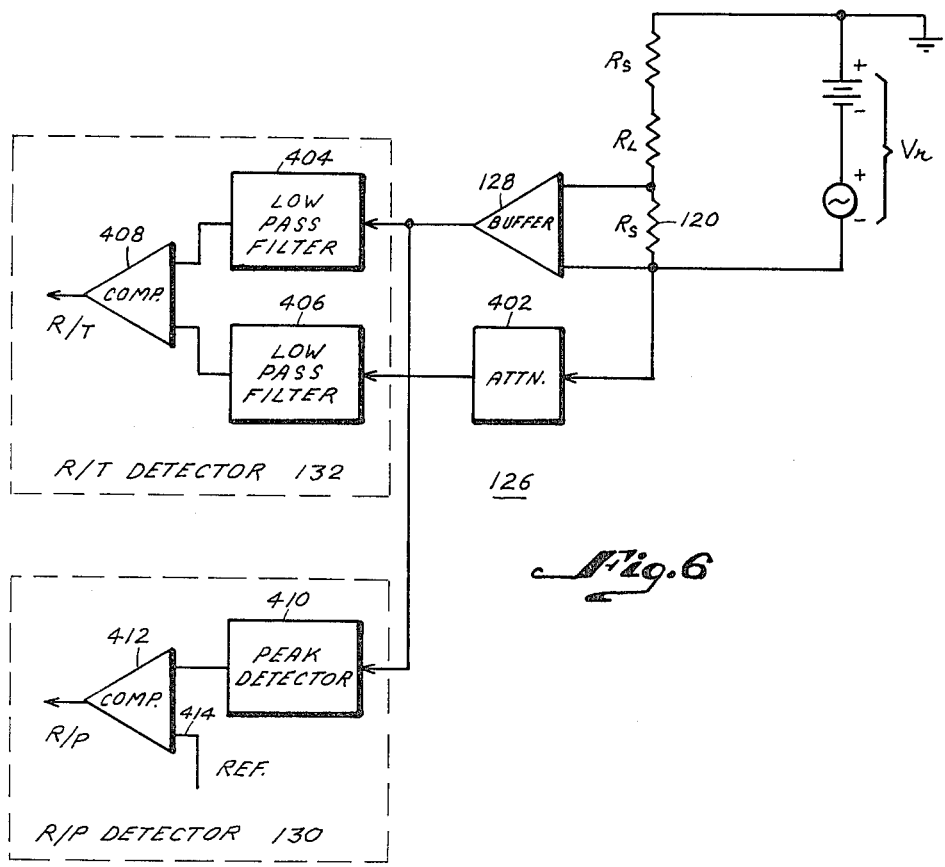
FIG. 6 is a block diagram of a ring supervision circuit used in the invention.

Referring now to FIG. 6, a block diagram of ring supervision circuit 126 is illustrated. Ringing voltage and current voltage is sensed across resistor 120 and coupled to ring-trip detector 132 via buffer 128 and attenuator 402, low pass filtered by filters 404 and 406 and coupled to the inputs of comparator 408; the output of which is a logical ring-trip signal. Essentially, ring trip is obtained by filtering out the ac components and comparing the remaining dc to a reference extracted from the source. Ring presence detector 130 detects the presence of ringing current from the output of buffer 128, coupling the output of buffer 128 to a peak detector 410; the output of which is compared in comparator 412 to a reference signal on line 414, which defines a threshold for a positive current present condition.

Figure 7:
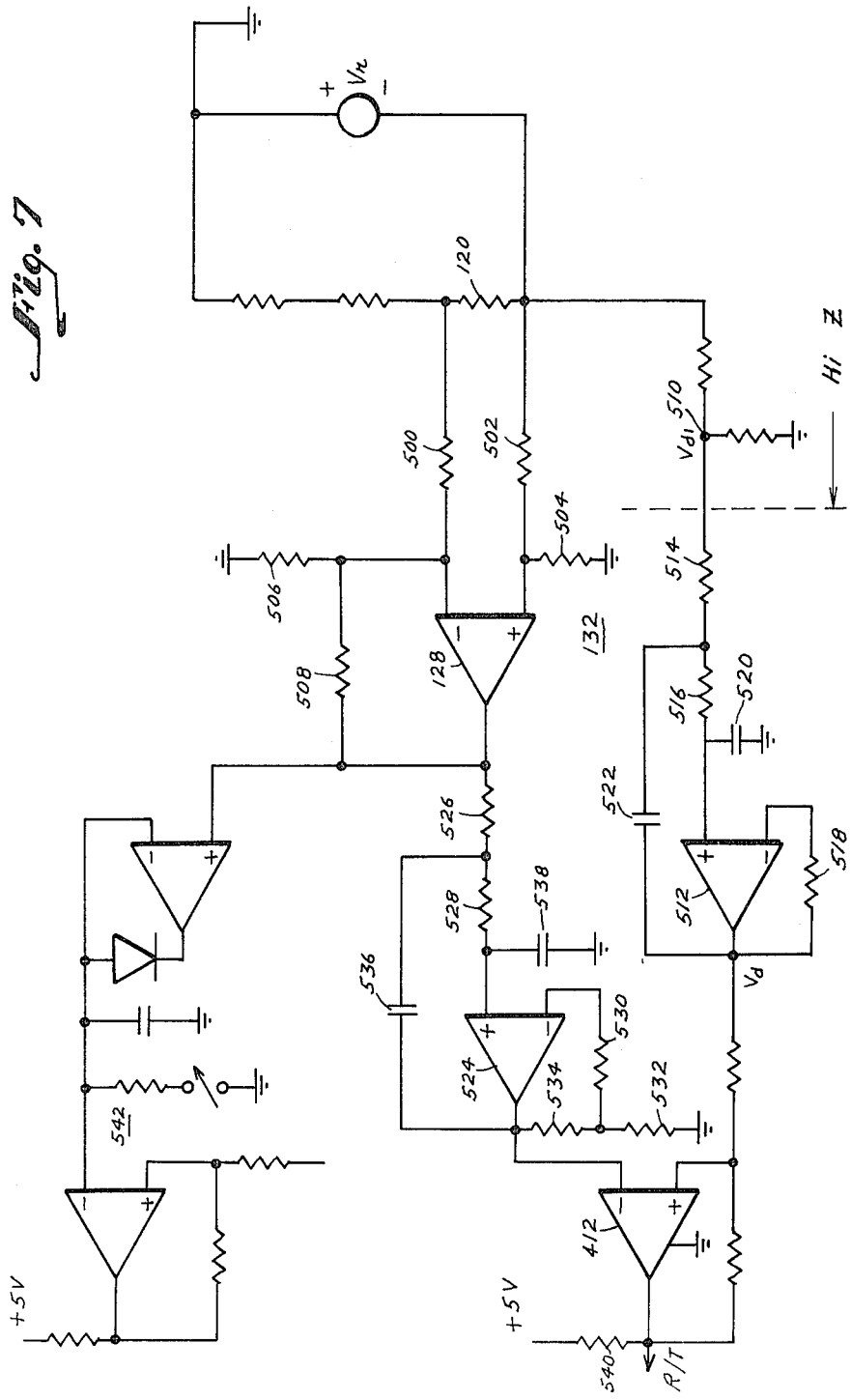
FIG. 7 is a schematic illustrative of greater detail of the ring supervision circuit described with reference to FIG. 6.

Referring now to FIG. 7, a detailed schematic of the ring-trip detector 132 is illustrated. Buffer 128 is biased by resistors 500, 502, 504, 506 and 508 and has an input from sensing resistor 120 as aforementioned. Current thru resistor 120 is attenuated in high impedance network 150 and is coupled to low-pass filter 512, biased by resistors 514, 516 and 518 and capacitors 520 and 522. Low-pass filter 524 has coupled to the input thereof the output of buffer 128, with biasing accomplished by resistors 526, 528, 530, 532 and 534 and capacitors 536 and 538. The outputs of filters 512 and 524 are coupled to comparator 412; the output of which is the ring-trip signal on the output of amplifier 412. The condition of current presence at the output of buffer 128 is also obtained by circuit 542, which obtains an ON-Hook or OFF-Hook signal. A logic low (0) is ON-Hook, while a logic high (1) is OFF-Hook.

Referring now to FIG. 8, control logic 140 is illustrated. Ring trip on line 540 and ring presence on line 600 are coupled to termination control interface 136 thru gates 602 and 604, with timing provided from flip flops 606 and 608 and the squarewave output at 96 KH from comparator 610. Ring trip and ring presence signals are coupled to TCI 136 on lines 612 and 614, respectively, from the control logic 140. The switch driver 114 polarity control signal from TCI 136 is coupled to NOR gate 616 on line 618, together with the multiplexed output of digital multiplex gates 620, which multiplex the squarewave outputs from ring signal reference sources 20 thru 26, fsQ1, fsQ2, fsQ3, fsQ4, respectively, on line 623.

Signals $f_1$, $f_2$, $f_3$ and $f_4$ from the ring signal reference generators and coin dc and coin relay are coupled through gates 622 to generate a signal ANDed with an enable signal from the processor at gate 624. The output of gates 622 is coupled on line 102 to analog multiplexer 100. The output of OR gate 624 is coupled as a trigger input to the 2.5 second timer 142.

Referring now to FIG. 9, a schematic diagram of timer 142 is illustrated. The enable signal on line 700 is coupled to the trigger and reset inputs of a 2.5 second clock circuit 702 and also to one input of NAND gate 704. The other input of NAND gate 704 is from the output of OR gate 624.

Figure 10:
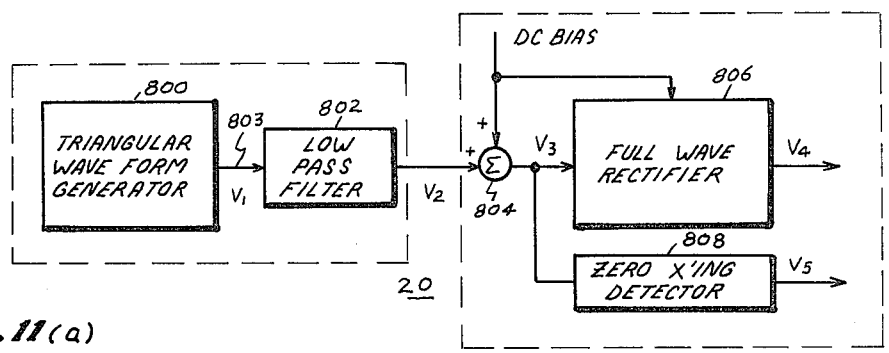
FIG. 10 is a block diagram of the ring signal reference source of the present invention.
Figure 11A:
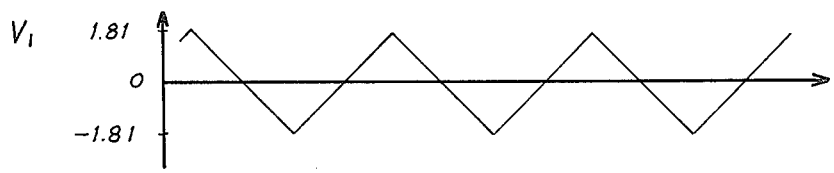
FIGS. 11(a) thru 11(e) are waveforms useful in describing the operation of the ring signal reference source illustrated by FIG. 10.
Figure 11B:
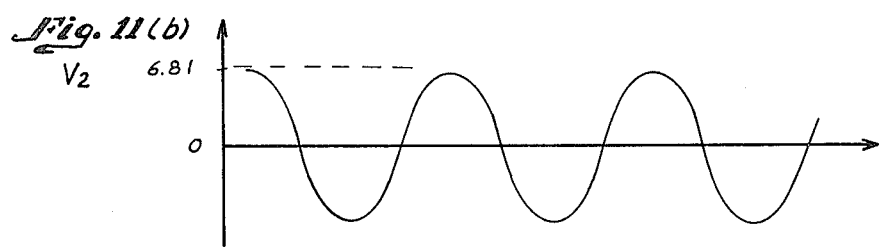
Figure 11C:
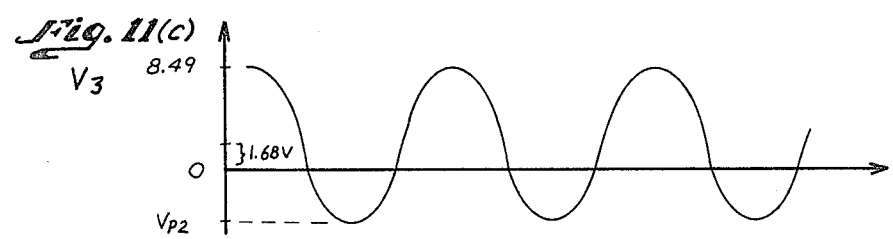
Figure 11D:
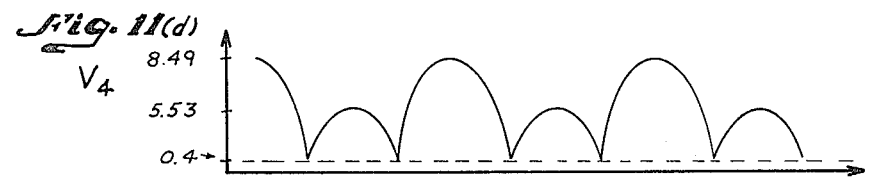
Figure 11E:

Referring now to FIG. 10, a ring signal reference source 20 is illustrated in functional block diagramatic form. FIGS. 11(a), 11(b), 11(c), 11(d) and 11(e) illustrate various waveforms appearing at critical points in the block diagram of FIG. 10 which are helpful in understanding the operation of the ring signal reference source. Triangular waveform generator 800 generates waveform $V_1$ as an output on line 803, which is illustrated by waveform 11(a); and which is filtered by low-pass filter 802, which has a filtered output $V_2$, illustrated by waveform 11(b). Signal $V_2$ is summed at summation node 804 with a dc bias signal which has a summed output $V_3$, illustrated by waveform 11(c). $V_3$ is coupled to a full wave rectifier 806 and to a zero crossing detector 808. The output of full wave rectifier 806 is $fs_1$, illustrated as $V_4$ by FIG. 11(d). The output of zero crossing detector 808 is fsQ1, illustrated as $V_5$ by FIG. 11(e).

FIG. 12 illustrates the detailed schematic of the ring oscillator circuit comprised of triangle waveform generator 800 and low-pass filter 802 of FIG. 10. Operational amplifiers 820 and 822 biased by resistances 824, 826, 828 and 830 and capacitor 832 generate $V_1$ illustrated at FIG. 11(a), which is a triangular waveform having a peak amplitude of 1.81 volts. The voltage $V_5$ at the output of operational amplifier 820 is a squarewave having an amplitude defined by the saturation of the operational amplifiers 820 and 822. Voltage $V_1$ is coupled to the low-pass filter 802 at the positive going input of operational amplifier 834, which is biased by resistors 836, 838 and 840 and capacitors 842 and 844. The output of operational amplifier 834 is $V_2$ illustrated by FIG. 11(b), which is a sine wave. Frequency adjustment is accomplished by varying resistor 826, the Q of filter 802 is 1.5873 and with a center frequency determined by the values of resistors 830 and 836. The dc gain is 2.373, using exemplary values.

Referring now to FIG. 13, a schematic of the full wave rectifier 806 and the zero crossing detector 808 of FIG. 10 is illustrated. Sine wave $V_2$ is coupled to operational amplifier 846, which is biased via resistors 848, 850, 852 and 854. The ac signal amplitude is adjustable via resistor 848 and the dc amplitude is adjustable via resistor 850. The operational amplifiers 856 and 858 are configured and biased by resistors 860, 862, 864, 866, 868, 870, 872 and 874 and diodes 876 and 878 to obtain at the output of amplifier 858 the signal $V_4$ of waveform 11(d), which is a dc bias rectified sine wave. The output of amplifier 846 is coupled to the positive going input of operational amplifier 880 to obtain the $V_5$ squarewave of waveform 11(e) at the output thereof.

Referring now to FIG. 14, a schematic of the dc voltages generation circuit 27 shown in FIG. 1 is illustrated. This circuit derives the various dc voltages needed for biasing the various components within the ringing signal generator and includes operational amplifiers 900, 902, 904 and 906, which generate, respectively, the bias to discharger 222 on line 908, bias to the termination control circuits 136 on line 910, reference bias for coin voltage on line 912 and bias to low level oscillators on line 914.

While the present invention has been described in connection with a preferred embodiment thereof, it is to be understood that additional embodiments, modifications and applications which will become obvious to those skilled in the art are included within the spirit and scope of the invention as set forth by the claims appended hereto.

I claim:
1. A digitally controlled ring signal generator comprising:
 ring signal generation circuit means for selectively amplifying at least a plurality of multi-frequency ringing signals for providing immediate ringing to one or more subscriber lines;
 loop current sensing means for sensing loop current;
 ring supervision circuit means responsive to said loop current sensing means for generating ringing supervisory signals;
 ring circuit control logic means responsive to said ringing supervisory signals and to an external data input, for generating an output control signal; and
 a ring signal reference source for coupling multi-frequency ringing signals to said ring signal generation circuit means in response to said output control signal, such that the characteristics of said ringing signals are selectable in accordance with said external data input and the presence or absence of the generated ringing signals is determined by said ringing supervisory signals.

2. A digitally controlled ring signal generator in accordance with claim 1 wherein said ring signal generation circuit means includes a dc to dc flyback converter for amplifying said ringing signals from low amplitude to high amplitude ringing signals, said dc to dc converter including a ferrite pulse transformer.

3. A digitally controlled ring signal generator in accordance with claim 1 wherein said external data input is comprised of processor output control data, said output control data being variable in accordance with the programming of said processor.

4. A digitally controlled ring signal generator in accordance with claim 3 wherein said ring circuit control logic means includes means for generating a ring circuit energizing signal for selectively enabling and disabling said ring signal generation circuit means.

5. A digitally controlled ring signal generator in accordance with claim 1 wherein said ring supervision circuit means includes ring-trip detection means responsive to subscriber OFF-Hook signal, and a ring presence detector means responsive to loop current sensing means, said ring trip detection means and said ring presence detector means each having an output corresponding to said ringing supervisory signals.

6. A digitally controlled ring signal generator in accordance with claim 5 wherein said ring-trip detection means comprises:
 low-pass filter means having said sensed loop current coupled thereto and having an ac filtered output; and
 comparator means for comparing said ac filtered output to a reference signal for generating a ring-trip signal output.

7. A digitally controlled ring signal generator in accordance with claim 5 wherein said ring presence detector means comprises:
 peak detector means having a signal representative of said sensed loop current coupled thereto and having an output; and
 comparator means for comparing the output of said peak detector means to a reference and for generating a ring presence signal output in response to said comparison.

8. A digitally controlled ring signal generator in accordance with claim 1 wherein said ring signal generation circuit means comprises:
 means for receiving a low level analog ringing signal;
 means for receiving a digital commutation signal synchronized to the frequency of said low level analog ringing signal;
 pulse width modulator means for converting said low level analog signal into a pulsed signal;
 dc to dc converter means for amplifying said pulsed signal and having a high level ringing signal output; and
 commutation switching means switched by said digital commutation signal for coupling said ringing signal to a ringing signal bus.

9. A digitally controlled ring signal generator in accordance with claim 8 wherein said low level analog ringing signal is a dc biased rectified sinusoidal signal.

10. A digitally controlled ring signal generator in accordance with claim 8 wherein said digital commutation signal is a squarewave.

11. A digitally controlled ring signal generator in accordance with claim 1 further comprising:
  analog multiplexer means for selecting any one of said multi-frequency signals from said ring signal reference source;
  digital multiplexer means for selecting a digital commutation signal synchronized to the selected multi-frequency signal; and
  commutation switching means controlled by said digital commutation signal, such that the generated ringing signals are comprised of the selected multi-frequency signal amplified by said ring signal generation circuit means and reconstructed by the synchronized commutation of said switches from portions of said selected multi-frequency signal.

12. A digitally controlled ring signal generator in accordance with claim 8 further comprising:
  discharger circuit means for providing ringing current in proportion to an error control signal derived from the input to said pulse width modulator means.

* * * * *